(12) United States Patent
Kim

(10) Patent No.: US 8,078,713 B1
(45) Date of Patent: Dec. 13, 2011

(54) DELIVERING POLICY SETTINGS WITH VIRTUALIZED APPLICATIONS

(75) Inventor: Danny Kim, Bellevue, WA (US)

(73) Assignee: Full Armor Corporation, Boston, MA (US)

( * ) Notice: Subject to any disclaimer, the term of this patent is extended or adjusted under 35 U.S.C. 154(b) by 56 days.

(21) Appl. No.: 12/380,990

(22) Filed: Mar. 5, 2009

Related U.S. Application Data

(60) Provisional application No. 61/068,210, filed on Mar. 5, 2008.

(51) Int. Cl.
*G06F 15/16* (2006.01)
(52) U.S. Cl. ......................... 709/223; 717/120
(58) Field of Classification Search ................. 709/223; 717/120
See application file for complete search history.

(56) References Cited

U.S. PATENT DOCUMENTS

| | | | |
|---|---|---|---|
| 6,983,202 B2 | 1/2006 | Sanqunetti | |
| 7,017,188 B1 * | 3/2006 | Schmeidler et al. | 726/26 |
| 7,765,544 B2 * | 7/2010 | Brickell et al. | 718/1 |
| 7,783,672 B2 * | 8/2010 | Whalen et al. | 707/802 |
| 7,870,613 B2 * | 1/2011 | Porter et al. | 726/25 |
| 7,925,605 B1 * | 4/2011 | Rubin | 706/47 |
| 7,950,026 B1 * | 5/2011 | Urbach | 719/329 |
| 7,984,322 B1 * | 7/2011 | Feeser et al. | 709/223 |
| 2006/0036570 A1 * | 2/2006 | Schaefer et al. | 707/1 |
| 2006/0090136 A1 * | 4/2006 | Miller et al. | 715/734 |
| 2006/0174320 A1 * | 8/2006 | Maru et al. | 726/1 |
| 2008/0183641 A1 * | 7/2008 | Tang et al. | 705/418 |
| 2009/0199178 A1 | 8/2009 | Keller et al. | |
| 2009/0260007 A1 * | 10/2009 | Beaty et al. | 718/1 |
| 2009/0327689 A1 * | 12/2009 | Lazar | 713/100 |
| 2011/0060995 A1 * | 3/2011 | Whalen et al. | 715/736 |
| 2011/0061045 A1 * | 3/2011 | Phillips | 717/173 |

* cited by examiner

*Primary Examiner* — Douglas Blair
(74) *Attorney, Agent, or Firm* — Hamilton, Brook, Smith & Reynolds, P.C.

(57) ABSTRACT

In an embodiment, a method includes receiving a group policy object from an active directory, combining the group policy object and logic for using the group policy object with a virtualized application to provide a virtualized group policy object and delivering the virtualized application and the virtualized group policy object to a targeted computer system.

10 Claims, 2 Drawing Sheets

DELIVERING POLICY SETTINGS WITH VIRTUALIZED APPLICATIONS

RELATED APPLICATION

This application claims the benefit of U.S. Provisional Application No. 61/068,210, filed on Mar. 5, 2008. The entire teachings of the above application are incorporated herein by reference.

BACKGROUND

Group policy is a concept that enables various user and computer settings to be defined and managed centrally on a network. In the Microsoft Windows environment, "Group Policy" and "Active Directory" services infrastructure enable information technology (IT) administrators to automate one-to-many management of users and computers—simplifying administrative tasks and reducing management costs.

Group policy has many advantages including centralizing computer system settings for various computer systems at a domain, site and/or organizational unit (OU) level in order to enforce uniformity across the computer systems; allowing the application of different policies to different sites, domains and OUs in order to manage, e.g., different sets of users; enabling user desktop environments to be managed in order to reduce, e.g., time spent troubleshooting configuration problems; enabling the installation, update, repair and removal of software on various computer systems to be centrally managed; and enabling the creation and management of account policies, configuration policies, audit policies and other security features in order to manage the security of computers and users in, e.g., a domain.

Group policy objects (GPOs) are often employed to implement certain policies on a computer system. A GPO is a structure that contains a collection of computer settings associated with a group policy. For example, a GPO may contain settings that determine access rights and privileges for a particular user when the user logs into a computer system. GPOs may be configured to perform various management tasks on a computer system, such as distributing registry settings, distributing security settings and/or deploying software. Further, GPOs may be configured to implement other policy related functions, such as establishing roaming user profiles and redirecting file system folders to, e.g., a network share file system. In a typical arrangement, a system administrator creates a GPO and targets it to a particular site, domain and/or organizational unit. The GPO is delivered to the appropriate computer systems which are then configured according to the contents of the GPO.

GPOs are stored on the domain controllers or on the client machines; GPOs stored on client machines are called local GPOs or LGPOs. Policy settings are acquired from both the GPOs on the domain controller (DC) and from the local GPOs and applied to the system.

A GPO may be organized into various types of policies including, for example, administrative templates, folder redirection, security settings, and software installation. Each policy type may, in turn, be configured to support a number of policy settings. For example, a GPO may contain administrative template settings that both hide icons on a user's desktop and prevent the user from running certain applications.

Policy settings are applied to a computer system when the system is started, a user logs into the system, a user logs out of the system or when the system is shut down. Additionally the settings for the system and user may be refreshed at regular intervals. For DCs, the policy settings are typically refreshed every five minutes. For client computers, the policy settings are typically refreshed every ninety minutes plus a random offset of up to thirty minutes. In addition, certain policy settings, such as policy settings associated with software installation and folder redirection, may be applied only when the system starts up or when a user logs into the system, and are not refreshed periodically.

SUMMARY

Policy settings have traditionally been defined with respect to an end user or a target computer system. As a result, any policies or security settings associated with a software application have been sent and applied to the user or to the computer that executes the particular software application. With the advent of application virtualization technology, which allows the delivery of a software application as a virtual streamed image to users/computers running within its own "virtual bubble" that is separate from the target computer's file and registry system, the application of corporate security policies such as Group Policy from Active Directory becomes a challenge.

Accordingly, embodiments of the present invention provide a method of "injecting" or inserting a virtualized group policy object into a virtualized application stream so that it is not only delivered to the virtualized application in the same manner that the application is streamed but also applies the policies inside the GPO to the virtualized application's file and registry system without affecting the target computer's file and registry.

A method includes receiving a GPO from an active directory, combining the GPO and logic for using the group policy object with a virtualized application to provide a virtualized group policy object and delivering the virtualized application and the virtualized group policy object to a targeted computer system.

A method includes receiving a virtualized application package including a virtualized application, a virtualized registry, a virtualized file system and a virtualized group policy object; executing the virtualized group policy object to deliver policy settings to the virtualized registry and virtualized file system; and executing the virtualized application subject to the policy settings in the virtualized registry and virtualized file system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

It should be noted that, illustrative embodiments of the present invention, described herein, are described as using the Microsoft Windows operating system. The Microsoft Windows operating system is available from Microsoft Corporation. It should be noted that other operating systems may be adapted to be used with the present invention including e.g., Unix, and Linux. In addition, the principles of the present approach can be applied to other application virtualization environments including those that operate in conjunction with such vendors as VMWare and Citrix.

Application virtualization aims to improve application compatibility and manageability by encapsulating applications from the underlying operating system on which they are executed. A virtualized application is not installed in the traditional sense. When a virtualized application is launched, a virtualization layer intercepts and transparently redirects any operations such as file I/O by that application. The virtualized application effectively believes it has direct access to the underlying operating system resources, although in effect it does not.

The present approach takes advantage of a capability provided in a software product called GPAnywhere® available from Full Armor Corporation. Generally, for policies to take effect on disconnected computers and mobile devices and laptops, such devices need to be connected to a network to access a policy store. This means that without an active connection to the network, policy generally cannot be applied.

With the standard GPAnywhere software product, the policies that need to be applied to the target machine or device are first exported to an executable. This "executable policy" contains code to process the policies and make changes to the configurations on the target device or computer. The executable can be transferred to the target device or computer using existing deployment methods of software distribution, a file copy over the network, emailed as an attachment, copied using removable media like floppy, USB drive, Compact discs (CD-R), etc. This does not require an active connection to the server or policy store. The executable policy is then executed, e.g., with command line options, to perform the policy update. This can be done using a script or batch file, or it can be scheduled using the scheduler on the target system, or interactively executed by the user. The configuration in the executable policy is applied to the target computer or device by the executable binary code.

Figure 1:
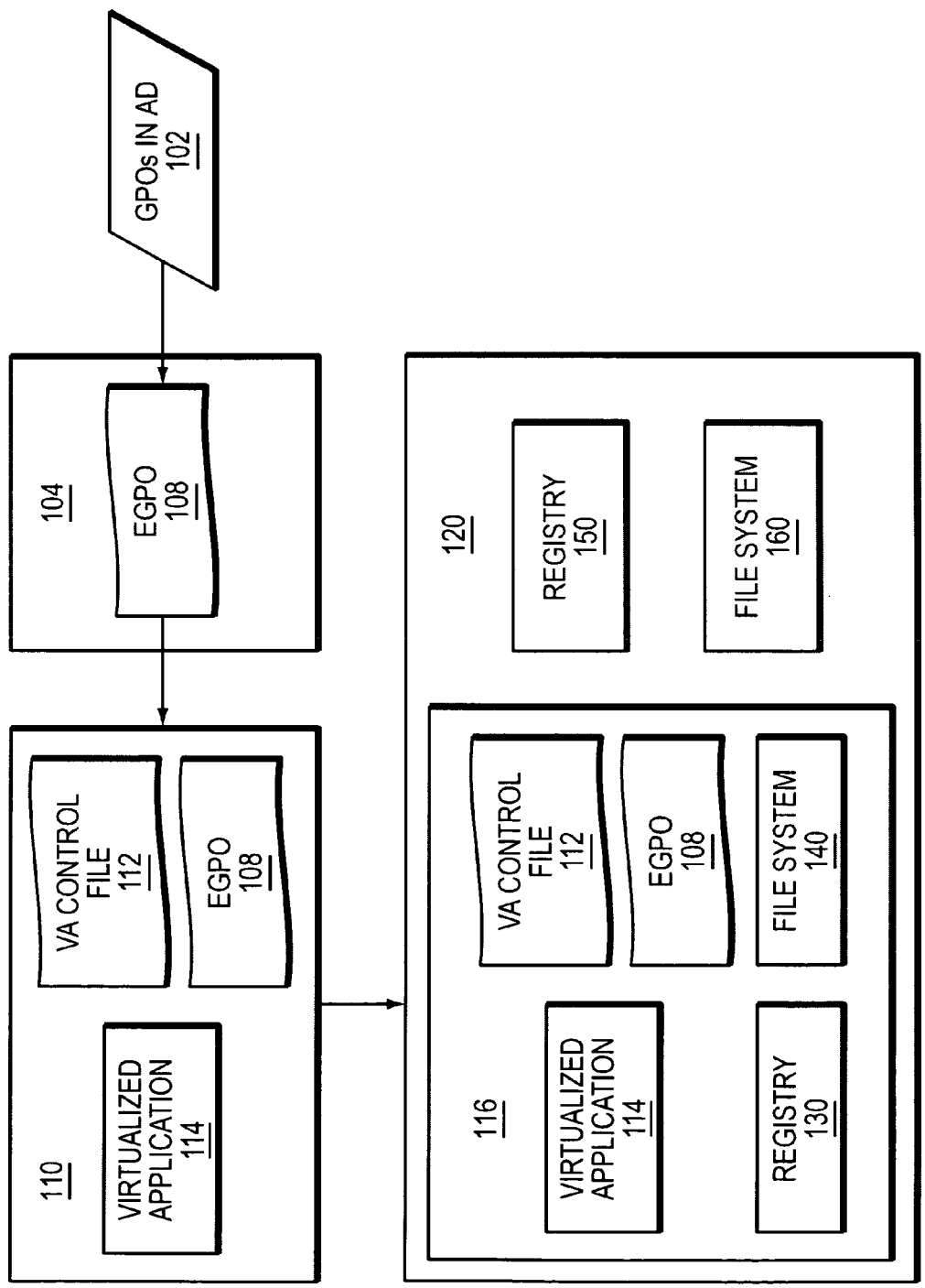
FIG. 1 illustrates elements of an example process flow for delivering policy settings with a virtualized application to a targeted computer system.

FIG. 1 illustrates elements of an example process for delivering policy settings with a virtualized application to a targeted computer system or device.

A GPO is taken from an active directory 102 and combined in a virtualization process 104 to produce an independent packaged file (executable binary, e.g., Win32 executable) referred to herein as a virtualized GPO and denoted EGPO 108. Rather than containing code to make changes to the configurations on the target device or computer as in the standard GPAnywhere product, the virtualized GPO includes logic on how to apply those settings to the internal registry and file system of a virtualized application independent of target device or computer.

The new virtualized GPO is "injected" or inserted into the virtualized application stream 110 which includes virtualized application 114, virtual application control file 112 and the EGPO 108. For the Microsoft SoftGrid® environment, the execution of the virtualized GPO is added to the virtualized application's initialization file (referred to as an OSD file) which controls execution of add-on processes before the virtualized application is launched.

Optionally, the virtualized GPO is sequenced into the virtualized application package itself In the Microsoft SoftGrid environment, the virtualized GPO modifies the virtual application's packaging file (MSI) and injects the virtualized GPO into the streamed application package so that it can be delivered along with the virtualized application to the targeted computer system or device 120.

When the virtualized application is executed by the user at the targeted computer system 120, the virtualized GPO is present on the file system of the virtual application "bubble" and the virtual application's initialization file (OSD) executes the virtualized GPO independent of the registry 150 and file system 160 of the targeted computer system 120.

The virtualized GPO, when executed, injects the policy settings into the virtualized registry 130 and virtualized file system 140 and enforces the policy so that the virtualized application 114 runs with the newly applied policy settings delivered through the virtualized GPO 108.

In some embodiments the virtualized application package containing the virtualized application and the virtualized GPO is streamed to the targeted computer system from an application server in an application service provider configuration. In some other embodiments the virtual application package is streamed to the targeted computer system from an application server in an enterprise-based configuration.

Figure 2:
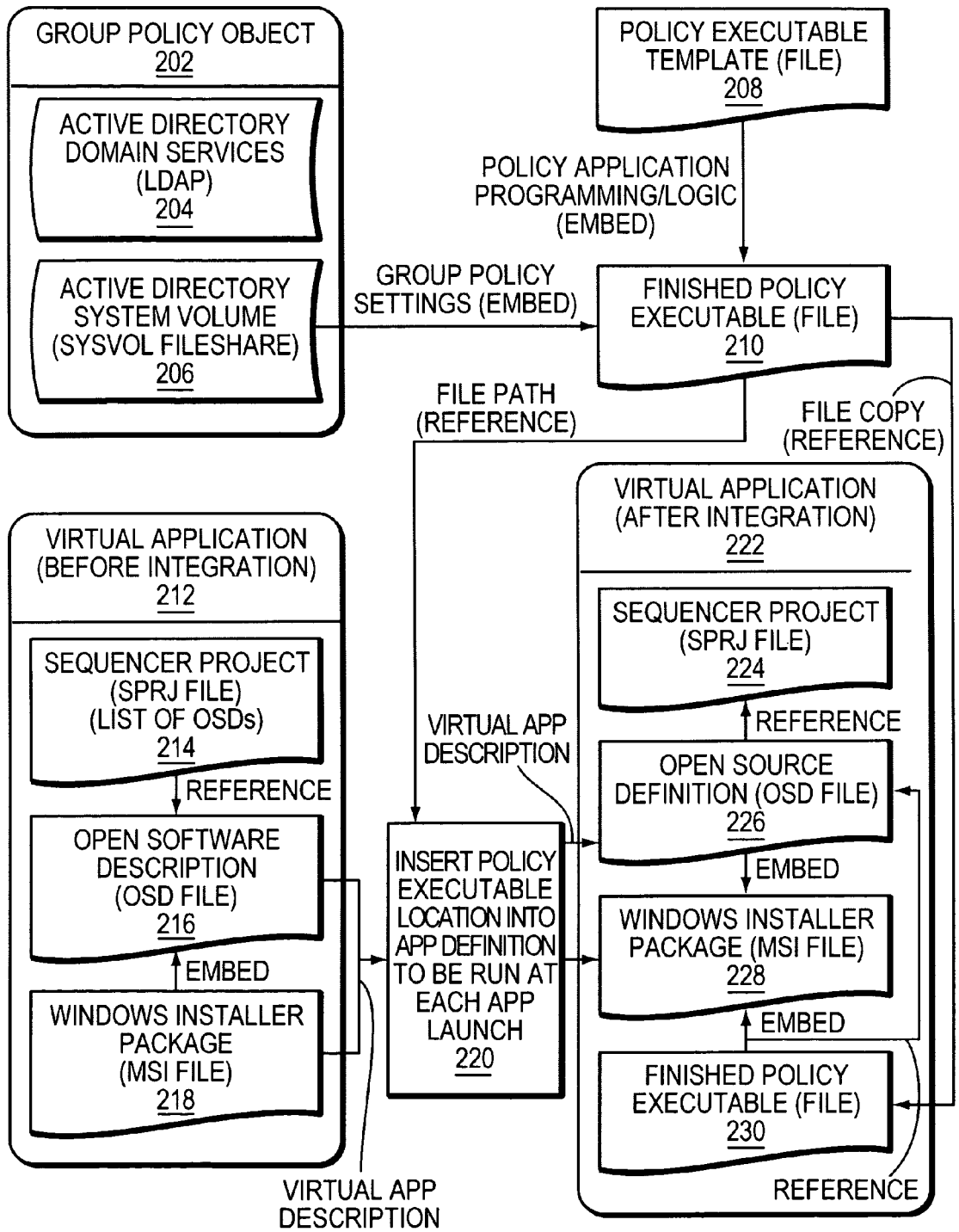
FIG. 2 illustrates elements of another example process flow for delivering policy settings with a virtualized application to a targeted computer system.

Referring now to FIG. 2, another example process flow for delivering policy settings with a virtualized application to a targeted computer system or device is shown. This process flow is described in the context of Microsoft Application Virtualization (App-V), formerly known as SoftGrid.

In the process flow, an administrator selects a GPO 202 in the Microsoft Group Policy Management Console. The administrator selects functional sections of Group Policy settings (e.g., scripts, security, Internet Explorer, administrative templates) to include in the policy executable.

The GPAnywhere Console contacts the (Microsoft Windows) Active Directory domain controller. It locates data for the selected GPO in the Active Directory System Volume ("SYSVOL") file-share 206. Lightweight Directory Access Protocol (LDAP) is the protocol used by the Active Directory directory service 204. Group Policy Object Editor uses LDAP to access the directory store on the domain controller. The client also uses LDAP to read the directory store on the domain controller.

The GPAnywhere Console prepares a Group Policy executable template file 208. This file is a Group Policy executable with no settings. It defines programming/logic used to apply settings both in a normal environment and in a virtual environment, and a framework for storing and accessing policy settings.

The GPAnywhere Console copies data from the Active Directory SYSVOL 206 into memory, and then writes that data directly into the prepared Group Policy executable template. The data is stored in an indexed binary table inside the Group Policy executable to provide a finished executable file 210.

The Group Policy executable 210 is next integrated with a virtual application. FIG. 2 shows the virtual application before integration 212 and after integration 222.

An application virtualization utility 220 is run to open three distinct types of files generated by an application virtualization sequencer, with different behavior for each file: an App-V sequencer project (SPRJ) file 214 which describes a set of virtual applications and is used to "install" the applications to App-V clients; an App-V open software description (OSD) file 216 which describes a virtual application and is used to "install" the application to App-V clients; and a Microsoft Installer Package (MSI) 218 for installing third-party programs which is run on App-V clients to install the virtual package it represents.

With respect to the App-V OSD file 216 which describes a virtual application, the utility 220 opens the OSD file 216 and locates a version string. If the version string does not match expected values, the utility displays an error and closes. Otherwise, the utility adds a section to the OSD file. This line is interpreted by the App-V client causing it to launch the Group Policy executable 230 each time the virtual application is launched. The utility saves the OSD file as modified OSD file 226 in the integrated virtualized application 222.

Regarding the MSI 218, the utility 220 opens the MSI and extracts all file resources from the package. The utility 220 modifies a Windows Installer internal manifest file to include the Group Policy executable. The utility 220 further modifies the OSD file 216 that it extracted from the MSI 218. The utility 220 recompiles all the MSI files, including the modified manifest, OSD, and the new Group Policy executable 230 to provide modified OSD file 226 and MSI 228 in the integrated virtual application 222.

With respect to the App-V SPRJ file which describes a set of virtual applications, the utility 220 opens the SPRJ file 214 and locates the OSD it describes for each virtual application. The utility 220 opens each OSD file in turn and proceeds as described above for each OSD file.

For any of the above scenarios, each time the App-V client launches a virtual application integrated with a Group Policy executable template, the template is run inside the virtual environment before the code representing the virtual application is executed. The Group Policy executable file may exist on a file-share. In that case, if the file is modified with new settings, the new settings will be applied inside the virtual environment.

When the Group Policy executable is run, an option configured in the OSD file instructs it to operate in virtualized mode. This causes it to only work inside the virtualized registry system, and not modify any non-virtualized operating system files or other data (as it would in normal operations).

The Group Policy executable extracts the Group Policy settings that were embedded in it and opens the Administrative Template registry data file. The Group Policy executable copies each Administrative Template setting into the virtual environment. The Group Policy executable closes, thus allowing the virtual application to finish launching. When the virtual application reads the virtual registry looking for a Group Policy setting, it finds the settings previously configured through execution of the Group Policy executable.

It should be understood that the application server and the targeted computer system may each include a processor and memory. The memory may be a computer readable medium organized as a random access memory (RAM) implemented using various RAM devices, such as dynamic random access memory (DRAM) devices. The memory may be configured to hold various computer executable instructions and data structures including computer executable instructions and data structures that implement aspects of the present approach. It should be noted that other computer readable mediums, such as disk units and flash memory, may be configured to hold computer readable instructions and data that implement aspects of the present approach.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
creating a virtualized group policy object executable by combining a group policy object having one or more policy settings with logic for using the group policy object with a virtualized application;
inserting the virtualized group policy object executable into a virtualized application package that includes the virtualized application;
delivering the virtualized application package to a targeted computer system running a virtual environment; and
executing the virtualized group policy object executable in the virtual environment to enforce the policy settings when the virtualized application is executed.

2. The method of claim 1 further comprising:
receiving the group policy object from an active directory.

3. The method of claim 1 further comprising:
receiving the group policy object generated from virtualized application registry settings.

4. The method of claim 1 where delivering includes:
streaming the virtualized application package containing the virtualized application and the virtualized group policy object executable to the targeted computer system from an application server in an application service provider configuration.

5. The method of claim 1 where delivering includes:
streaming the virtualized application package containing the virtualized application and the virtualized group policy object executable to the targeted computer system from an application server in an enterprise-based configuration.

6. A method comprising:
receiving, at a target computer system that includes a registry and a file system, a virtualized application package from an application server, the virtualized application package including a virtualized application, a virtualized registry, a virtualized file system and a virtualized group policy object executable having policy settings embedded therein;
executing the virtualized group policy object executable to extract the embedded policy settings and deliver the extracted policy settings to the virtualized registry and the virtualized file system; and
executing the virtualized application subject to the policy settings in the virtualized registry and the virtualized file system and independent of the registry and the file system of the target computer system.

7. A non-transitory computer readable medium comprising computer executable instructions for execution in a processor for:
creating a virtualized group policy object executable by combining a group policy object having one or more policy settings with logic for using the group policy object with a virtualized application;
inserting the virtualized group policy object executable into a virtualized application package that includes the virtualized application;
delivering the virtualized application package to a targeted computer system running a virtual environment where executing the virtualized group policy object executable in the virtual environment enforces the policy settings when the virtualized application is executed.

8. The non-transitory computer readable medium of claim 7 further comprising computer executable instructions for execution in the processor for:
receiving the group policy object from an active directory.

9. The non-transitory computer readable medium of claim 7 further comprising computer executable instructions for execution in the processor for:
receiving the group policy object generated from virtualized application registry settings.

10. A non-transitory computer readable medium comprising computer executable instructions for execution in a processor for:

receiving, at a target computer system that includes a registry and a file system, a virtualized application package from an application server, the virtualized application package including a virtualized application, a virtualized registry, a virtualized file system and a virtualized group policy object executable having policy settings embedded therein;

executing the virtualized group policy object executable to extract the embedded policy settings and deliver the extracted policy settings to the virtualized registry and the virtualized file system; and executing the virtualized application subject to the policy settings in the virtualized registry and the virtualized file system and independent of the registry and the file system of the target computer system.

\* \* \* \* \*